United States Patent [19]

Shumaker

[11] 3,933,552
[45] Jan. 20, 1976

[54] PREPARING TRANSPARENT ASSEMBLIES FOR LAMINATION

[75] Inventor: Lyle L. Shumaker, Natrona Heights, Pa.

[73] Assignee: PPG Industries, Inc., Pittsburgh, Pa.

[22] Filed: July 10, 1974

[21] Appl. No.: 487,333

[52] U.S. Cl. ............... 156/104; 156/106; 156/286
[51] Int. Cl.² ........................................ C03C 27/10
[58] Field of Search ............ 156/104, 103, 99, 102, 156/105, 106, 109, 107, 285, 286, 309, 297; 53/9

[56] References Cited
UNITED STATES PATENTS

| | | | |
|---|---|---|---|
| 2,948,645 | 8/1960 | Keim | 156/104 |
| 3,281,296 | 10/1966 | Jameson | 156/104 |
| 3,347,723 | 4/1963 | Hill | 156/104 |
| 3,769,132 | 10/1973 | Cram | 156/286 |
| 3,808,077 | 4/1974 | Rieser et al. | 156/104 |
| 3,810,815 | 5/1974 | Welhart et al. | 156/104 |

Primary Examiner—Douglas J. Drummond
Assistant Examiner—Michael W. Ball
Attorney, Agent, or Firm—Edward I. Mates

[57] ABSTRACT

Laminated safety glass panels comprising sheets of rigid transparent material, such as glass, polycarbonate, acrylic plastic, polyester and the like, alternating with interlayer materials, such as polyvinyl butyral, polyurethane and the like, are prepressed to remove entrapped air at the interfacial surfaces to prepare the assemblies for final lamination. When the relatively rigid plies to be laminated have unsmooth surfaces, such as wavy surfaces, or surfaces having imperfections due to the penetration of the sheet during thermal treatment by tongs or other solid members that engage the rigid transparent sheet during its heat treatment prior to assembly for lamination, the preliminary pressing as performed by the prior art techniques is insufficient to prevent oil from an oil autoclave used in the final laminating step from penetrating into the interfacial surfaces between adjacent rigid and relatively flexible layers of the assembly to be laminated. The present invention provides a novel technique combining prior art techniques that have been used in the past with a novel peripheral evacuation chamber to enable existing autoclaves to complete the laminating operation while preventing the oil in the autoclave from penetrating into the vision area of the laminate along the interfacial surfaces between rigid and flexible layers of the laminated transparent window that results, which oil penetration causes a reject of the fabricated window.

10 Claims, 4 Drawing Figures

PREPARING TRANSPARENT ASSEMBLIES FOR LAMINATION

BACKGROUND OF THE INVENTION

1. Field of the Invention

This invention relates to the lamination of rigid transparent sheets of glass or glass substitutes, such as polycarbonates, polyester resins, acrylic plastics and the like, with flexible interlayer materials such as polyvinyl butyral, polyurethanes and the like. The lamination of such materials produces laminated safety glass which has been developed for various uses, especially as windshield closures.

Flat assembles to be laminated have been initially treated by a prepressing operation to bond the plastic interlayer to the opposing surfaces of the relatively rigid layers by heating the assembly and then passing the heated assembly between a pair of resilient nipper rolls. A typical glass rolling apparatus is disclosed in U.S. Pat. No. 2,673,168 to Pascoe and Rugg. Another technique employed to prepress such assemblies to be laminated is disclosed in U.S. Pat. No. 2,948,645 to Keim. In this latter patent, the periphery and the margin only of the assembly is enclosed in a flexible channel shaped member made of a fluid impervious material to place the member in engagement with a marginal portion of the outer surfaces of the assembly and in spaced relation to at least part of the periphery of the assembly to provide a conduit adjacent the periphery of the interfaces between the interlayer and the relatively rigid glass sheets, air is evacuated from the conduit through the member to remove air from between the interlayer and the glass sheets, the assembly and the material enclosing it are heated to an elevated temperature to bond the interlayer to each glass sheet in at least its marginal area while continuing the evacuation to maintain the vacuum in the conduit, the member enclosing the assembly is removed, and the assembly is ready for a final pressing operation.

Regardless of whether the prepressing step is performed by the roll pressing apparatus depicted in the Pascoe et al patent or by the peripheral evacuation technique as disclosed in the Keim patent, the prepressed assembly is then ready for final lamination where the assembly is directly exposed in an autoclave to an elevated temperature and an elevated fluid pressure substantially above atmospheric pressure and sufficient to bond the interlayer to the glass sheets substantially throughout the entire area of the assembly. As long as the relatively rigid sheets of glass or recognized glass substitutes are very smooth, the prepressing operation, whether performed by nipper rolls or by peripheral evacuation channels, is sufficient to prepare the assembly for its final laminating step in an oil autoclave. However, when the surface of the relatively rigid sheet of glass or glass substitute material is not smooth and has either a wavy appearance or is provided with departures from smoothness caused by engaging the glass while hot enough to be deformed with solid materials or glass handling elements needed to support the rigid material during a thermal treatment such as thermal tempering prior to assembling the elements for lamination, the prior art technique for prepressing has been found to be unsuitable. Oil has penetrated the prepressed assembly during the final laminating step in an oil autoclave.

In the past, oil penetration has been avoided by assembling the layers of rigid transparent material and interlayer material to form an assembly to be laminated. The assembled layers were taped together and the taped assembly inserted within a flexible bag which was then sealed and evacuated. The sealed bag and its contents were inserted in an oil autoclave and subjected to elevated heat and pressure for sufficient time to complete the lamination and produce a transparent laminated assembly. After lamination, the bag was opened and the laminated transparent assembly removed. Such a technique uses a flexible bag of the type described in U.S. Pat. No. 3,255,567 to Keslar and Rankin. While such bags avoided oil penetration during lamination, the cost of the bags and of the labor needed to perform a laminating operation using such bags made it economically unfeasible to use such a laminating method except in cases where the cost of the ultimate laminated window was not of any concern.

SUMMARY OF THE INVENTION

According to the present invention, a novel prepressing method has been developed. This prepressing method involves a combination of roll pressing and peripheral evacuation performed simultaneously when the sheets of transparent rigid material have surfaces that are sufficiently unsmooth to make it impossible to provide a preliminary edge seal by either roll pressing alone or peripheral evacuation alone of the assembly. Unless the prepressing step is performed according to the present invention, oil penetration into the prepressed assembly cannot be avoided during the final laminating step when the prepressed assembly is subjected to elevated temperature and pressure while in direct contact with oil in an oil autoclave.

According to the method of this invention, the assembly to be laminated is enclosed within a peripheral evacuation chamber provided with apertures aligned to communicate with the interfacial surfaces between the interlayer sheet and the sheets of relatively rigid material. The peripheral evacuation chamber is sufficiently thin relative to the thickness of the assembly to be laminated that when a pair of nipper rolls is applied to prepress the assembly by roll pressing, the nipper rolls are spaced sufficient distance from one another so as not to contact the peripheral evacuation chamber.

The peripheral evacuation chamber is subjected to a vacuum during the time that the entire package including the assembly to be laminated enclosed within the peripheral evacuation chamber is passed between a pair of nipper rolls. Surprisingly, the combination of nipper roll pressing and peripheral evacuation provides suitable removal of entrapped air and gases and moisture from the interfacial surfaces between the interlayer and the rigid glass or glass substitute layers that the assembly can be subjected to a final lamination step in an oil autoclave at elevated temperatures and pressure without experiencing oil penetration. It is unnecessary to insert the prepressed assembly into a laminating bag of the type disclosed in U.S. Pat. 3,255,567 to Kesslar and Rankin.

BRIEF DESCRIPTION OF THE DRAWINGS

In the drawings which form part of the description of an illustrative embodiment of the present invention, and wherein like reference number refer to like structural elements.

DESCRIPTION OF THE PREFERRED EMBODIMENT

Figure 1:
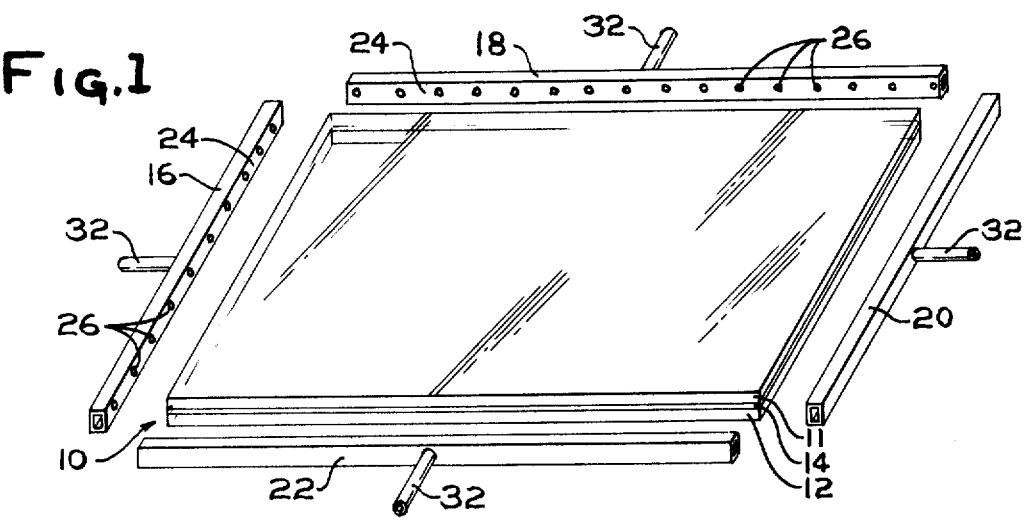
FIG. 1 is an exploded isometric view of a package comprising a glass-plastic assembly and a frame like evacuation channel to be applied to the assembly to perform a prepressing method conforming to the present invention.
Figure 2:
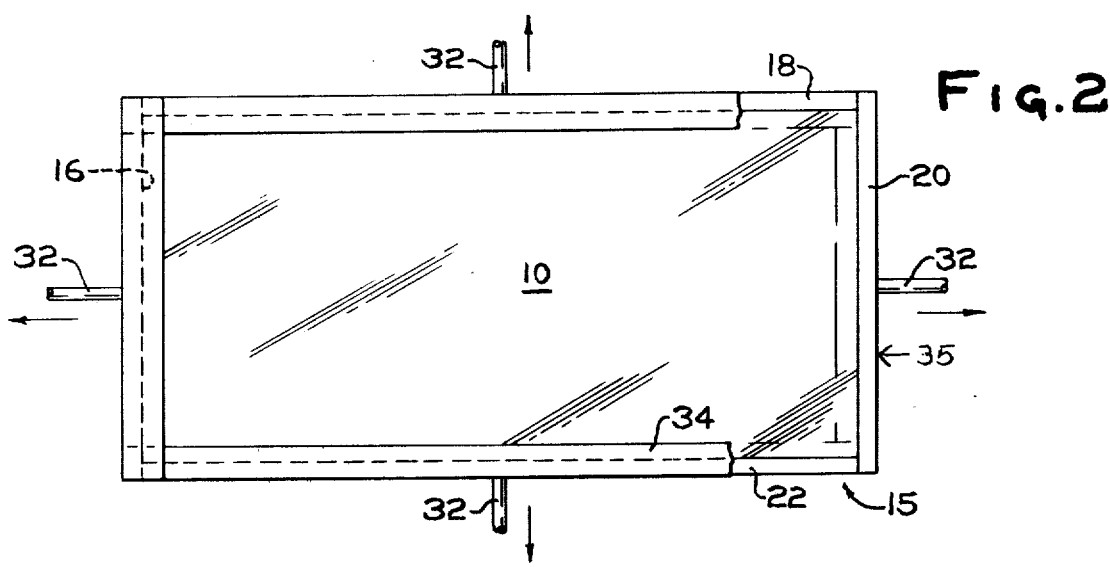
FIG. 2 is a plan view of the assembly showing it in an assembled relationship to the frame-like evacuation channel to form the package for prepressing and with certain parts removed to show other parts of the package clearly.
Figure 3:
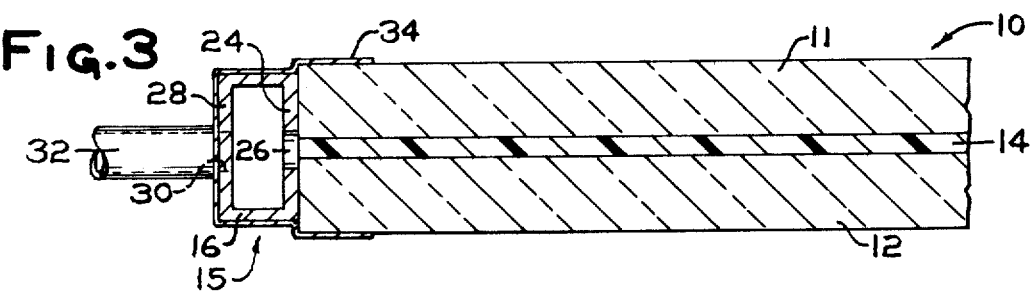
FIG. 3 is a fragmentary enlarged cross-sectional view of an edge portion of the assembly.
Figure 4:
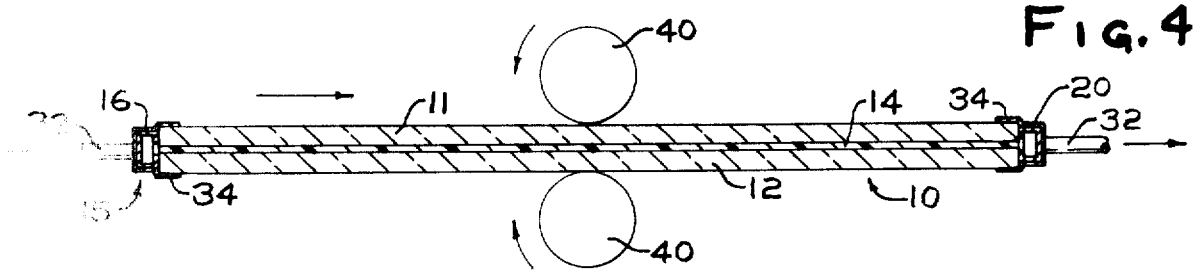
FIG. 4 is a cross-section showing the arrangement of the assembly relative to a pair of pressing rolls illustrating that the pressing rolls are spaced apart from one another a distance equal to the thickness of the glass-plastic assembly to be prepressed and a greater distance than the height of the frame-like evacuation chamber surrounding the assembly to be prepressed.

A glass-plastic assembly 10 to be prepressed comprises two sheets 11 and 12 of matching rectangular outline of relatively rigid transparent material, such as glass or a glass substitute, whose surfaces are not exactly smooth, and an interlayer 14 of a flexible material, such as a polyvinyl acetal such as polyvinyl butyral, or polyurethane or the like commonly used to laminate glass sheets together. While the assembly to be prepressed is disclosed as containing two sheets of glass and one sheet of flexible material, it is understood that the assembly may include additional alternate layers of relatively rigid transparent material and relatively flexible material to provide an assembly of more or less than three layers to be laminated to form a transparent safety window closure. Furthermore, each interlayer of flexible material may consist of many plies of similar or dissimilar material and still be considered an interlayer. In addition, one or more of the rigid transparent sheets of glass may be made of any of the commonly known glass substitutes such as polycarbonates, acrylic plastics, polyesters and the like.

The assembly also comprises a peripheral evacuation chamber 15 comprising rectangular tubes 16, 18, 20 and 22. Each rectangular tube is provided with an apertured inner wall 24 that abuts one of the side edges along the perimeter of the glass-plastic assembly 10. The inner wall 24 is provided with spaced apertures 26. The apertures 26 are aligned with the interfacial surfaces along the outer edge of the interlayer 14. The apertures may have diameters that are larger than the thickness of the interlayer or may be arranged in staggered relation along rows that face the interfacial surfaces so that the apertures communicate with the interfaces between each glass sheet 11 or 12 and the interlayer 14.

Each rectangular tube has an outer wall 28 provided with an opening 30 provided with a fitting 32 adapted to receive an end of a vacuum hose line (not shown). The latter in turn communicates with a vacuum pump (also not shown).

The rectangular tubes 16, 18, 20 and 22 have a height less than the thickness of the glass plastic assembly 10 to be prepressed prior to final lamination. A thin flexible tape of air impervious material, such as Mystic tape 7375 sold by Chatfield and Woods of Pittsburgh, Pennsylvania or Permacel tape 927 sold by the Permacel Corporation of New Brunswick, New Jersey, is used to attach the four rectangular tubes 16, 18, 20 and 22 to the four sides of the rectangular assembly 10 with their spaced apertures 26 facing the outer perimeter of the glass-plastic assembly and their outer wall encompassed by the tape 34. The tape 34 may also be used to enclose the ends of any rectangular tube whose open ends would otherwise be exposed to the atmosphere. The resulting package 35 is ready for lamination.

EXAMPLE

A typical assembly to be prepressed and laminated comprises two tempered glass sheets ¼ inch thick and a plastic interlayer of polyvinyl butyral 0.060 inch thick surrounded by rectangular tubes made of metal 1/32 inch thick, ¼ inch wide and ½ inch high oriented so that the inner wall 24 and the outer wall 28 of each rectangular tube is ½ inch high and each of the walls of the rectangular tubes connecting the walls 24 and 28 is parallel to the major surfaces of the assembly and is offset inwardly about 30 mils at its extremity from the adjacent outer surface of the glass-plastic assembly. The thin flexible tape 34 of air impervious material is two to three mils thick. The glass-plastic assembly together with the rectangular tubes and the tape forms a package that is subjected to simultaneous roll pressing and evacuation through the peripheral evacuation chamber 15 formed by the four rectangular tubes. Of course, if desired, the peripheral evacuation chamber 15 may be replaced by two or more evacuation chambers, such as one for each side of the assembly to be prepressed.

To accomplish the preliminary pressing, the package 35 of the illustrative embodiment was heated to a temperature of about 175°F. for 5 to 6 minutes, in the case of a polyvinyl butyral interlayer and a slightly higher temperature for a polyurethane interlayer. Vacuum was applied to the peripheral evacuation chamber and the entire package 35 with the rectangular tubes 16, 18, 20, 22 and the tape 34 surrounding the glass-plastic assembly 10 was passed between a pair of pressing rolls 40 maintained at a space such that the minimum distance between the opposing peripheries of the pressing rolls 40 was approximately equal to the thickness of the glass-plastic assembly, and more than the height of the rectangular tubes plus two thicknesses of tape which form the package 35 containing the glass-plastic assembly 10.

After a glass-plastic assembly was prepressed as part of the package 35 in the manner recited, the tape 34 and the rectangular tubes 16, 18, 20 and 22 were removed and a batch of prepressed assemblies were loaded in an oil autoclave where they were subjected to temperatures as high as 275°F. and a pressure of 200 pounds per square inch for 20 to 45 minutes. Glass-plastic assemblies prepressed in the manner disclosed above were suitable for sale to the customer.

In contrast to the above example, glass-plastic assemblies that were prepressed using either peripheral evacuation alone without pressing rolls or using pressing rolls alone without evacuation through a peripheral evacuation chamber such as that provided by the rectangular tubes in the illustrative embodiment described previously were unfit for sale to the customer because oil from the autoclave penetrated the interfacial surfaces of the laminate, particularly in the vicinity where the glass had been gripped by tongs during the tempering operation prior to its assembly with the plastic interlayer in preparation for lamination.

The package may also be altered by incorporating parting material at an interfacial surface between one of the transparent rigid sheets and a layer of interlayer material. During prepressing, the parting material becomes bonded to either the rigid transparent material (such as is the case with metalo organosiloxane parting materials to glass or certain glass substitutes) or to the interlayer material (such as is the case with polyvinyl fluoride parting material to polyvinyl butyral or other polyvinyl acetals). The prepressed assembly is taped to maintain a unitary structure during final lamination in the autoclave. The parting material enables the rigid transparent sheet adjacent thereto to be separated from the rest of the assembly after the remaining layers have been laminated together to form a transparent safety laminated window.

The form of the invention shown and described in this disclosure represents an illustrative preferred embodiment and certain modifications thereof. It is understood that various changes may be made without departing from the gist of the invention as defined in the claimed subject matter which follows.

I claim:

1. In a method of laminating safety glass assemblies comprising a sheet of flexible interlayer material and at least one sheet of relatively rigid, transparent material having at least a portion of its major surface in a non-smooth condition comprising assembling said sheet of flexible interlayer material intermediate two sheets of relatively rigid, transparent material with a non-smooth surface of said relatively rigid transparent material facing a surface of said interlayer material, prepressing said assembly by roll forming and subjecting said assembly to elevated heat and pressure to complete the lamination, the improvement comprising enclosing said assembly within a peripheral evacuation chamber thinner than the thickness of said assembly and disposed entirely inward of the outer major surfaces of said assembly to form a package, said evacuation chamber communicating with the interfacial surface between said rigid sheet and said interlayer, heating said package to a temperature sufficient to soften said interlayer material, evacuating said evacuation chamber to withdraw any air, gas and/or moisture from the interfacial surfaces, maintaining a pair of nipper rolls spaced apart a distance approximately equal to the thickness of the assembly, and passing said package between said nipper rolls so spaced while said interlayer material is sufficiently hot to be softened and while continuing said evacuation of said peripheral chamber to prepress said assembly and prepare said assembly for final lamination at elevated temperature and pressure in an autoclave.

2. The improvement as in claim 1, wherein said assembly to be laminated comprises two sheets of said relatively rigid, transparent material and said peripheral evacuation chamber is arranged to communicate with both interfacial surfaces between said interlayer material and said relatively rigid, transparent sheets.

3. The improvement as in claim 2, wherein said evacuation chamber comprises a series of individual chambers, each abutting a different portion of the periphery of said assembly and communicating with different portions of the interfaces between said relatively rigid transparent sheets and said interlayer sheet, including the step of evacuating said individual evacuation chambers simultaneously.

4. The improvement as in claim 2, wherein said assembly is quadrilaterally shaped and said evacuation chamber comprises a series of chambers, one abutting each wall of said assembly, including the step of evacuating each of said individual chambers simultaneously.

5. The improvement as in claim 2, wherein said relatively rigid, transparent material is glass.

6. The improvement as in claim 2, wherein said relatively rigid, transparent material is a glass substitute taken from the class consisting of polycarbonates, acrylic plastics, polyesters and the like.

7. The improvement as in claim 2, wherein said interlayer material is a polyvinyl acetal.

8. The improvement as in claim 2, wherein said interlayer material is polyurethane.

9. The improvement as in claim 2, wherein parting material is applied between one of said two sheets of relatively rigid, transparent material and said flexible interlayer material prior to enclosing said assembly within said peripheral evacaution chamber and wherein said parting material is maintained therebetween throughout said steps, said peripheral evacuation assembly is removed after said assembly is prepressed, said prepressed assembly is held together during said final lamination in an autoclave and said one sheet of relatively rigid, transparent material is separated from the remainder of said assembly after said assembly is subjected to the elevated temperature and pressure in the autoclave for sufficient time to effect said final lamination.

10. The improvement as in claim 7, wherein said polyvinyl acetal is polyvinyl butyral.

* * * * *